United States Patent
Eickmeyer et al.

(10) Patent No.: US 9,384,119 B2
(45) Date of Patent: *Jul. 5, 2016

(54) WEB PAGE ERROR REPORTING

(71) Applicant: Microsoft Technology Licensing LLC, Redmond, WA (US)

(72) Inventors: Kellie Eickmeyer, Seattle, WA (US); Harley Michael Rosnow, Kirkland, WA (US); Evguenia Maliouta, Bellevue, WA (US); John M. Hawkins, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/165,034

(22) Filed: Jan. 27, 2014

(65) Prior Publication Data

US 2014/0143606 A1 May 22, 2014

Related U.S. Application Data

(63) Continuation of application No. 13/294,898, filed on Nov. 11, 2011, now Pat. No. 8,677,188, which is a continuation of application No. 12/772,684, filed on May 3, 2010, now Pat. No. 8,060,789, which is a continuation of application No. 11/820,710, filed on Jun. 20, 2007, now Pat. No. 7,739,551.

(51) Int. Cl.
*G06F 11/00* (2006.01)
*G06F 11/36* (2006.01)
*G06F 11/07* (2006.01)

(52) U.S. Cl.
CPC ........ *G06F 11/3676* (2013.01); *G06F 11/0709* (2013.01); *G06F 11/0742* (2013.01); *G06F 11/0748* (2013.01); *G06F 11/0775* (2013.01); *G06F 11/0781* (2013.01)

(58) Field of Classification Search
CPC ............ G06F 11/3676; G06F 11/0775; G06F 11/0781

See application file for complete search history.

(56) References Cited

U.S. PATENT DOCUMENTS

| 5,553,235 A | 9/1996 | Chen et al. |
| 5,790,780 A | 8/1998 | Brichta et al. |

(Continued)

OTHER PUBLICATIONS

"Notice of Allowance", U.S. Appl. No. 13/618,177, Jul. 1, 2014, 6 pages.

(Continued)

*Primary Examiner* — Michael Maskulinski
(74) *Attorney, Agent, or Firm* — Bryan Webster; Judy Yee; Micky Minhas

(57) ABSTRACT

An error in a web page displayed on a device is detected. The error is assigned to a bucket to indicate a type of the error, and a record describing the current state of the device is generated. Both an indication of the bucket and the record describing the current state of the device are then sent to a server. At the server, error information including error records and bucket identifiers are received from multiple devices. Each error record describes a current state of one of the multiple devices at a time when an error in a web page displayed on the one device was detected. Each bucket identifier corresponds to one of the error records and describes a type of the error associated with that error record. The error records are grouped into multiple baskets based at least in part on the current state information in the error records.

20 Claims, 6 Drawing Sheets

(56) References Cited

U.S. PATENT DOCUMENTS

| | | | |
|---|---|---|---|
| 5,793,966 A | 8/1998 | Amstein et al. | |
| 5,903,728 A | 5/1999 | Semenzato | |
| 6,006,279 A | 12/1999 | Hayes | |
| 6,148,336 A | 11/2000 | Thomas et al. | |
| 6,151,569 A | 11/2000 | Elliott | |
| 6,170,065 B1 | 1/2001 | Kobata et al. | |
| 6,216,237 B1 | 4/2001 | Klemm et al. | |
| 6,353,926 B1 | 3/2002 | Parthesarathy et al. | |
| 6,385,699 B1 | 5/2002 | Bozman et al. | |
| 6,490,574 B1 | 12/2002 | Bennett et al. | |
| 6,526,524 B1 | 2/2003 | Kelley | |
| 6,591,379 B1 | 7/2003 | LeVine et al. | |
| 6,629,267 B1 | 9/2003 | Glerum et al. | |
| 6,651,084 B1 | 11/2003 | Kelley et al. | |
| 6,662,318 B1 | 12/2003 | Baysah et al. | |
| 6,681,344 B1 | 1/2004 | Andrew | |
| 6,708,333 B1 | 3/2004 | Glerum et al. | |
| 6,738,928 B1 | 5/2004 | Brown | |
| 6,738,932 B1 | 5/2004 | Price | |
| 6,854,016 B1 | 2/2005 | Kraenzel et al. | |
| 6,871,345 B1 | 3/2005 | Crow et al. | |
| 6,886,114 B2 | 4/2005 | Parry | |
| 6,950,990 B2 | 9/2005 | Rajarajan et al. | |
| 7,039,833 B2 | 5/2006 | Knuutila et al. | |
| 7,082,555 B2 | 7/2006 | Toyooka et al. | |
| 7,149,928 B2 | 12/2006 | van Os | |
| 7,290,181 B2 | 10/2007 | D'Angelo et al. | |
| 7,308,487 B1 | 12/2007 | Dansie et al. | |
| 7,325,045 B1 | 1/2008 | Manber et al. | |
| 7,398,433 B2 | 7/2008 | Benedek et al. | |
| 7,475,293 B1 | 1/2009 | Little et al. | |
| 7,506,047 B2 * | 3/2009 | Wiles, Jr. | G06F 11/3414 707/999.001 |
| 7,552,365 B1 | 6/2009 | Marsh et al. | |
| 7,650,397 B2 | 1/2010 | Price et al. | |
| 7,685,273 B1 | 3/2010 | Anastas et al. | |
| 7,716,322 B2 | 5/2010 | Benedikt et al. | |
| 7,725,574 B2 | 5/2010 | O'Connell | |
| 7,739,551 B2 | 6/2010 | Eickmeyer | |
| 7,769,895 B1 | 8/2010 | Williams et al. | |
| 7,856,453 B2 | 12/2010 | Malik et al. | |
| 7,933,926 B2 | 4/2011 | Ebert | |
| 8,060,789 B2 | 11/2011 | Eickmeyer et al. | |
| 8,112,673 B2 | 2/2012 | Benedek et al. | |
| 8,209,680 B1 | 6/2012 | Le et al. | |
| 8,356,211 B2 | 1/2013 | Benedek et al. | |
| 8,677,188 B2 | 3/2014 | Eickmeyer | |
| 8,874,970 B2 | 10/2014 | Benedek | |
| 2001/0014968 A1 | 8/2001 | Mohammed | |
| 2002/0149615 A1 | 10/2002 | Rajarajan et al. | |
| 2002/0188696 A1 | 12/2002 | Ullmann et al. | |
| 2003/0051027 A1 | 3/2003 | Aupperle et al. | |
| 2003/0110482 A1 | 6/2003 | Ferguson et al. | |
| 2004/0059809 A1 | 3/2004 | Benedikt et al. | |
| 2004/0078686 A1 | 4/2004 | Toyooka et al. | |
| 2004/0078689 A1 | 4/2004 | Knuutila et al. | |
| 2004/0083474 A1 | 4/2004 | McKinlay et al. | |
| 2004/0153823 A1 | 8/2004 | Ansari | |
| 2004/0205076 A1 | 10/2004 | Huang et al. | |
| 2005/0076281 A1 | 4/2005 | Kojima | |
| 2005/0177597 A1 | 8/2005 | Elmer | |
| 2005/0204199 A1 | 9/2005 | Harper et al. | |
| 2005/0229104 A1 | 10/2005 | Franco et al. | |
| 2006/0047724 A1 | 3/2006 | Messing et al. | |
| 2006/0156077 A1 | 7/2006 | Altaf et al. | |
| 2006/0161800 A1 | 7/2006 | Dathathraya et al. | |
| 2007/0174419 A1 | 7/2007 | O'Connell et al. | |
| 2008/0155340 A1 | 6/2008 | Tsun | |
| 2008/0228690 A1 | 9/2008 | Horovitz | |
| 2008/0229323 A1 | 9/2008 | Mackey | |
| 2008/0235339 A1 | 9/2008 | Lurey et al. | |
| 2008/0235536 A1 | 9/2008 | Benedek | |
| 2008/0275951 A1 | 11/2008 | Hind et al. | |
| 2008/0320343 A1 | 12/2008 | Eickmeyer | |
| 2009/0037882 A1 * | 2/2009 | Allen | G06F 11/3664 717/125 |
| 2009/0063908 A1 | 3/2009 | Sankaran et al. | |
| 2010/0218053 A1 | 8/2010 | Eickmeyer | |
| 2012/0060065 A1 | 3/2012 | Eickmeyer | |
| 2012/0137183 A1 | 5/2012 | Benedek | |
| 2013/0013954 A1 | 1/2013 | Benedek | |

OTHER PUBLICATIONS

"Collecting diagnostic information after a server or client crash", http://www-12.lotus.com/ldd/doc/domino_notes/7.0/help7_admin.nsf/f4b82fbb75e942a6852566ac0037f284/c982c19f7664a24d8525706f0065ec44?OpenDocument, printed on Apr. 18, 2007, 2 pages.

"Crashes in MS Office when Acrobat is Present", Retrieved from: <http://www.rdpslides.com/psfaq/FAQ00042.htm> on Apr. 12, 2012,Dec. 1, 2001, 2 pages.

"Description and Availability of Internet Explorer Error Reporting Tool", Published on: Nov. 9, 2004, Retrieved from: http://support.microsoft.com/kb/276550, on Apr. 18, 2013, Apr. 18, 2013, 2 pages.

"Description and Availability of Internet Explorer Error Reporting Tool", Retrieved From: http://web.archive.org/web/20021201024116/http://support.microsoft.com/default.aspx?scid=kb;en-us;q276550, 2003, 4 pages.

"Enable/Disable Flash", Retrieved from: <http://www.deftone.com/blogzilla/archives/enabledisable_flash.html> on Apr. 16, 2012,Nov. 20, 2002, 1 page.

"Final Office Action", U.S. Appl. No. 10/814,591, Jan. 24, 2008, 10 pages.

"Final Office Action", U.S. Appl. No. 12/133,337, Oct. 14, 2010, 11 pages.

"Final Office Action", U.S. Appl. No. 12/772,684, Mar. 7, 2011, 9 pages.

"Final Office Action", U.S. Appl. No. 13/618,177, Jan. 29, 2014, 17 pages.

"Final Office Action", U.S. Appl. No. 13/618,177, Jul. 1, 2013, 14 pages.

"Macromedia Flash Player 5.0 Causes an Error Message in Windows XP", http://support.microsoft.com/default.aspx?scid=KB;EN-US;q320219&, Jul. 21, 2002, 2 pages.

"Mal Function", The Web Error Reporter; retrieved from http://www.gonmad.co.uk/malf/ on Apr. 16, 2013, 3 pages.

"Microsoft Computer Dictionary, 5th Edition", Microsoft Press, 2002, 2002, p. 445.

"Microsoft Error Reporting", http://web.archive.org/web/20040207013043/http://watson.microsoft.com/dw/1033/dcp.asp?SD=GN&LN=EN-US&gssnb=1, 2003, 4 pages.

"Non-Final Office Action", U.S. Appl. No. 10/814,591, Nov. 1, 2006, 14 pages.

"Non-Final Office Action", U.S. Appl. No. 10/814,591, May 30, 2007, 13 pages.

"Non-Final Office Action", U.S. Appl. No. 11/820,710, Oct. 8, 2009, 8 pages.

"Non-Final Office Action", U.S. Appl. No. 12/133,337, May 6, 2011, 8 pages.

"Non-Final Office Action", U.S. Appl. No. 12/133,337, Jun. 28, 2010, 6 pages.

"Non-Final Office Action", U.S. Appl. No. 12/772,684, Oct. 18, 2010, 7 pages.

"Non-Final Office Action", U.S. Appl. No. 13/294,898, Aug. 24, 2012, 6 pages.

"Non-Final Office Action", U.S. Appl. No. 13/365,990, Apr. 19, 2012, 15 pages.

"Non-Final Office Action", U.S. Appl. No. 13/618,177, Jan. 2, 2013, 16 pages.

"Notice of Allowance", U.S. Appl. No. 10/814,591, Apr. 3, 2008, 9 pages.

"Notice of Allowance", U.S. Appl. No. 11/820,710, Jan. 29, 2010, 4 pages.

"Notice of Allowance", U.S. Appl. No. 12/133,337, Sep. 30, 2011, 4 pages.

"Notice of Allowance", U.S. Appl. No. 12/772,684, Jun. 29, 2011, 4 pages.

(56) References Cited

OTHER PUBLICATIONS

"Notice of Allowance", U.S. Appl. No. 13/294,898, Apr. 8, 2013, 5 pages.
"Notice of Allowance", U.S. Appl. No. 13/294,898, Jul. 25, 2013, 5 pages.
"Notice of Allowance", U.S. Appl. No. 13/294,898, Oct. 28, 2013, 5 pages.
"Notice of Allowance", U.S. Appl. No. 13/294,898, Dec. 10, 2012, 4 pages.
"Notice of Allowance", U.S. Appl. No. 13/365,990, Aug. 22, 2012, 4 pages.
"Quality feedback Agent", Retrieved from: <http://www.mozilla.org/quality/qfa.html> on Apr. 18, 2007, Jan. 12, 2005, 3 pages.
"Troubleshooting Audio Performance", Retrieved from: <http://www.tweakheadz.com/troubleshooting_audio_cards.htm> on Apr. 13, 2012, Mar. 2002, 7 pages.
"Windows 95/98/2000/NT MS Word 97/2000 Document Viewer: Installation and Getting Started", University of Virginia, Retrieved from:http://web.archive.org/web/20050319111242/www.itc.virginia.edu/desktop/docs/cdrom/windows_95_98_nt/word_97_viewer/, Feb. 21, 2001, 1 page.
Arlat, et al.,' "Dependability of COTS Microkernel-Based Systems", IEEE Transactions on Computers 51(2):, Feb. 2002, pp. 138-163.
Cabello, "Airbag to be added to Mozilla applications", Retrieved from: <http://mozillalinks.org/wp/2006/09/airbag-to-be-added-to-mozilla-applications/> on Apr. 18, 2007, Sep. 13, 2006, 7 pages.
Damm, "The Effectiveness of Software Error-Detection Mechanisms in Real-Time Operating Systems", Proc. of 16th Intl. Symposium on Fault-Tolerant Computing (FTCS-16), IEEE Computer Society, Vienna, Austria,, Jul. 1986, pp. 171-176.
Hollis, et al.,' "Developing a Common User Interface for Information Searching", The Electronic Library 13(4), Aug. 1995, pp. 283-286.
Microsoft "How to Troubleshoot Program Faults with Dr. Watson", Retrieved from: <http://support.microsoft.com/kb/275481> on Jun. 13, 2007, 2007, 3 pages.
Microsoft "Microsoft Customer Experience Improvement Program", Retrieved from: <http://www.microsoft.com/products/ceip/en-us/default.mspx?pf=true> on Jun. 13, 2007, Oct. 1, 2005, 2 pages.
Oh, et al.,' "Control Flow Checking by Software Signatures", IEEE Transactions on Reliability 51(1), Mar. 2002, pp. 111-122.
Smith, "Cost Profile of a Highly Assured, Secure Operating System", AMC Transactions on Information and Systems Security 4(1); rick_smith@securecomputing.com, Feb. 2001, 24 pages.
Smith, "Internet Explorer Security Options, Part 2", Windows IT Pro, retrieved from: http://www.windowsitpro.com/article/activex/internet-explorer-security-options-part-2, Apr. 21, 2001, 3 pages.
"Mozilla Firefox Privacy Policy", Retrieved from <<http://www.mozilla.org/en-US/privacy/archive/firefox/2006-10/>> on May 13, 2014, Oct. 2006, 5 pages.
Carruth, "Add Crash Reporting to Your Applications with the CrashRpt Library—CodeProject", Retrieved from <<http://www.codeproject.com/Articles/3497/Add-Crash-Reporting-to-Your-Appliction>> on May 8, 2014, Mar. 19, 2003, 9 pages.
Spolsky, "Get Crash Reports from Your Users—Automatically", FogBugz 5.0 Documentation, Aug. 2006, 7 pages.

* cited by examiner

WEB PAGE ERROR REPORTING

RELATED APPLICATIONS

This application is a continuation of U.S. patent application Ser. No. 13/294,898, filed Nov. 11, 2011, entitled "Web Page Error Reporting" to Kellie Eickmeyer, et al., which is hereby incorporated by reference herein in its entirety. U.S. patent application Ser. No. 13/294,898 is a continuation of U.S. patent application Ser. No. 12/772,684, now U.S. Pat. No. 8,060,789, filed May 3, 2010, entitled "Web Page Error Reporting" to Kellie Eickmeyer, et al., which is hereby incorporated by reference herein in its entirety, and which is a continuation of U.S. patent application Ser. No. 11/820,710, now U.S. Pat. No. 7,739,551, filed Jun. 20, 2007, entitled "Web Page Error Reporting" to Kellie Eickmeyer, et al., which is hereby incorporated by reference herein in its entirety.

BACKGROUND

The world wide web, or simply the web, has made available many different web pages that users can navigate to and read. Some web pages maintain this simple functionality, while other web pages have evolved to the point where they embed programs that run when a user navigates to the web page. These programs can improve the user's experience of the web page, and can also increase the functionality that is made available to users of the web page. However, one problem faced with these programs as well as web pages in general is that it is difficult for the web page designer or web site publisher to get feedback regarding errors that occur during operation of these programs or display of the web page.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the web page error reporting discussed herein, an error in a web page displayed on a device is detected. The error is assigned to a bucket to indicate a type of the error, and a record describing the current state of the device is generated. At least one of the record and an indication of the bucket is sent to an error reporting server.

BRIEF DESCRIPTION OF THE DRAWINGS

The same numbers are used throughout the drawings to reference like features.

DETAILED DESCRIPTION

Web page error reporting is discussed herein. Programs, referred to herein as web applications, can be embedded in web pages. An error monitoring module on a device monitors web pages as they are displayed on the device, including monitoring of web applications as they run on the device. The error monitoring module detects errors in the web pages and web applications as they occur. When an error is detected, the error is assigned to one of multiple buckets based on the type of error, and a record describing the current state of the device is generated. This record and the assigned bucket for the error is sent to a reporting server. The reporting server collects records from multiple devices and uses the records as well as the assigned buckets to assign the errors to one of multiple baskets. The information regarding the baskets, as well as the generated records, can be made available to the web page and/or web application designer in order for the designer to review the errors and determine any appropriate changes that should be made to the web page and/or web application.

Figure 1:
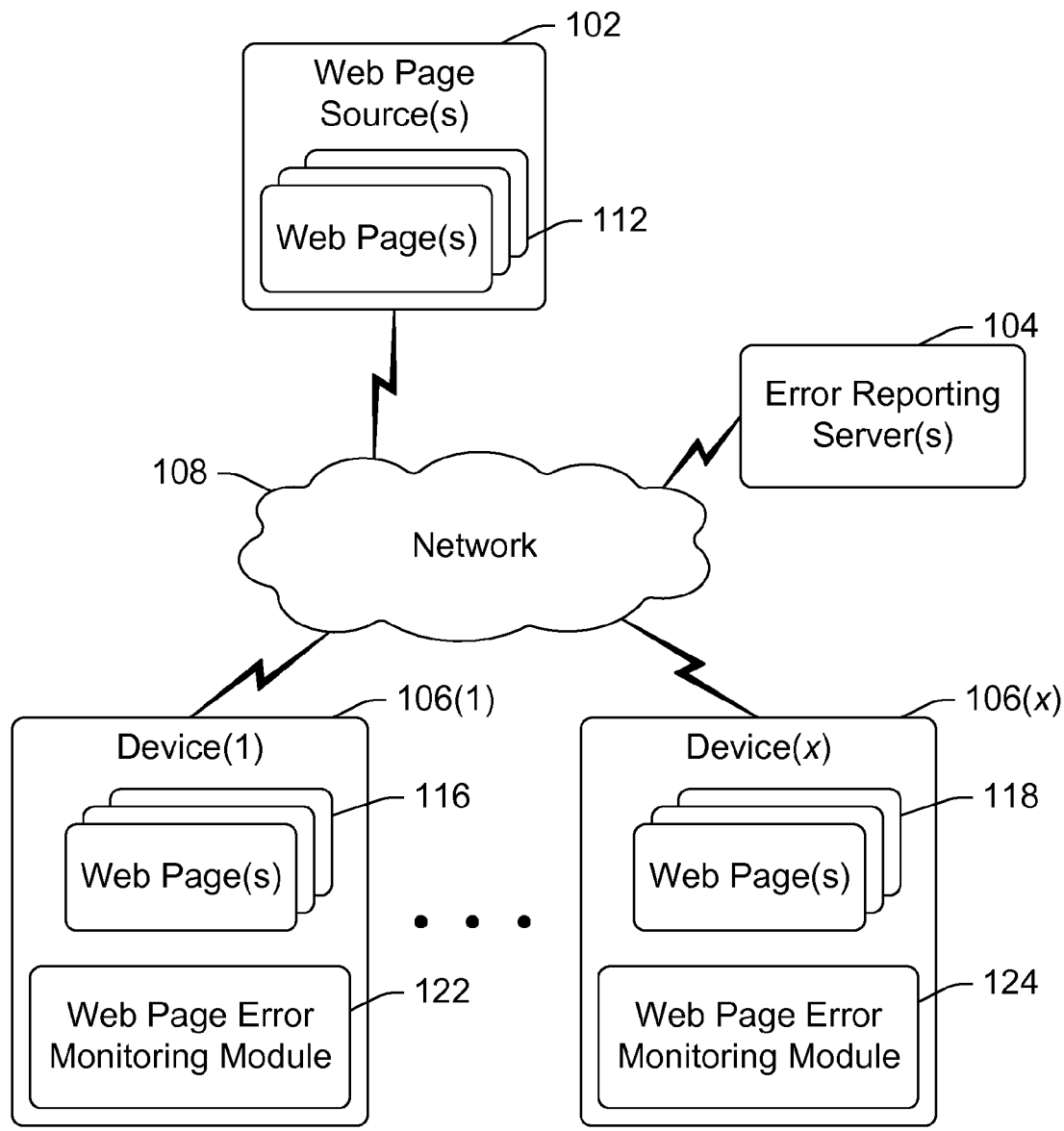
FIG. 1 illustrates an example system in which the web page error reporting can be employed.

FIG. 1 illustrates an example system 100 in which the web page error reporting can be employed. System 100 includes one or more web page sources 102, one or more error reporting servers 104, and multiple (x) devices 106(1), . . . , 106(x). These components 102-106 can communicate with one another over network 108. Network 108 can be any of a variety of networks, such as the Internet, a local area network, other public and/or proprietary networks, combinations thereof, and so forth.

Web page source(s) 102 and error reporting server(s) 104 can be implemented on one or more computing devices. Multiple ones of web page source(s) 102 and error reporting server(s) 104 can optionally be implemented on the same computing device (e.g., two web page sources 102 may be implemented on the same computing device, a web page source 102 and an error reporting server 104 may be implemented on the same computing device, and so forth).

Web page source 102 makes web pages 112 available to devices 106. One or more of these web pages can each include one or more web application(s). A web application refers to an application that is accessed over the Internet and run on a device 106. A web application is not a stand-alone application. Rather, the web application is included or embedded in a web page that is loaded by another application running on device 106, such as a web browser. When the web page is loaded, the web application is also loaded and run by the other application (e.g., the web browser). Additional information can be displayed or otherwise presented by the web page along with the user interface generated by running the web application. Alternatively the only information displayed or otherwise presented to the user from the web page is from the user interface generated by running the web application.

A web application can be included directly in a web page by, for example, including the instructions or code for the web application as part of the markup for the web page itself. A web application can also be included indirectly in a web page by, for example, including a link or other reference to where the instructions or the code for the web application can be obtained. The web browser (or other application) on device 106 accesses this linked-to or otherwise referenced location to obtain the instructions or the code for the web application. Web applications can be written in any of a variety of different languages, such as: the JScript® development software available from Microsoft Corporation of Redmond, Wash.; the JavaScript™ technology available from Sun Microsystems, Inc. of Santa Clara, Calif.; AJAX (Asynchronous JavaScript and XML); and so forth.

References to errors in web pages are made herein. It is to be appreciated that errors in web pages include errors in web applications embedded in web pages, errors in other portions of the web pages, and errors in web pages in which no web applications are embedded.

Web page source 102 can be, for example, a web server that hosts web pages. Alternatively, web page source 102 can be other components or devices, such as a cache, a proxy, and so forth. Additionally, it is to be appreciated that a web page and/or web application, once obtained from another component or device via network 108, can be cached locally at devices 106.

Web page source 102 can have one or more web pages 112 and different sources 102 typically have different web pages 112. Alternatively, two or more sources 102 may have the same web page 112. Web applications are typically included as part of a web page(s) that can be navigated to by devices 106.

Devices 106 represent any of a variety of different types of computing devices, such as desktop computers, laptop computers, handheld computers or personal digital assistants (PDAs), automotive computers, cellular phones, game consoles, and so forth. Devices 106 obtain web pages 116, 118 from web page source(s) 102 and display those web pages 116, 118, including running any web applications embedded therein. Different devices 106 can obtain and display different web pages 116, 118, or alternatively the same web pages. Web pages 116, 118 are selected ones of web pages 112. A particular web application can be selected to be run on device 106 in a variety of different manners, such as by the user of a device 106 navigating to a web page that includes a web application (e.g., using a web browser or other suitably configured application), the user entering a command to select a particular web application, another program (not shown) running on device 106 (or on some other device) selecting a program, and so forth. As used herein, the user refers to the end user of a device 106 (e.g., an individual viewing web pages).

Each device 106 also includes a web page error monitoring module 122, 124. Web page error monitoring module 122, 124 monitors web pages 116, 118 for errors. When an error is detected by module 122, 124, module 122, 124 reports the error by sending an indication of a type of the error and optionally a record of a current state of the device 106 at the time the error was detected to error reporting server 104. Web page error monitoring module 122, 124 can be implemented as a stand-alone program, or alternatively can be incorporated as part of another program (e.g., a web browser).

Figure 2:
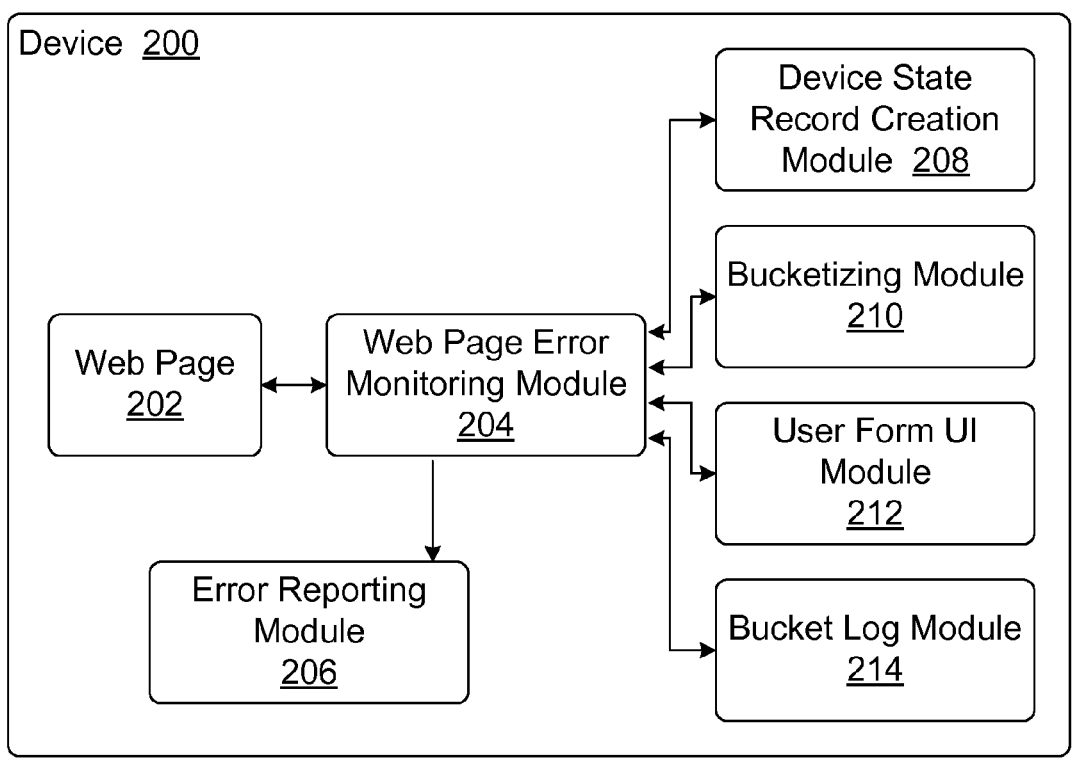
FIG. 2 illustrates an example device that can be used with the web page error reporting discussed herein.

FIG. 2 illustrates an example device 200 that can be used with the web page error reporting discussed herein. Device 200 can be, for example, a device 106 of FIG. 1.

Device 200 includes a web page error monitoring module 204, an error reporting module 206, a device state record creation module 208, a bucketizing module 210, a user form user interface (UI) module 212, and a bucket log module 214. Each of modules 204-214 can be implemented in software, firmware, hardware, or combinations thereof. A web page 202, which can include a web application, is also displayed on device 200. Web page 202 can be any of web pages 116, 118 of FIG. 1. It is to be appreciated that although a single web page is illustrated in FIG. 2, multiple different web pages can be displayed on device 200 sequentially and/or concurrently.

Generally, web page error monitoring module 204 monitors web page 202 and detects errors in web page 202. These errors can be automatically detected, or alternatively user form UI module 212 can present a user interface that allows the user of web page 202 to specify errors he or she identifies. User-specified errors are grouped together in buckets by bucket log module 214, and automatically detected errors are grouped together in buckets by bucketizing module 210. In response to a detected error, whether user-specified or automatically detected, device state record creation module 208 generates a record describing a current state of device 200. Error reporting module 206 sends this record to error reporting server 104 of FIG. 1. Error reporting module 206 also sends to server 104 an indication of a type of the error being reported, this type being identified by the bucket to which the error is assigned by module 210 or 214.

Any of a variety of different errors can be encountered when displaying a web page, including errors encountered when running a web application embedded in the web page. Generally, an error refers to the situation where something with the web page and/or web application does not behave as desired or intended by the author or developer of the page or application. Examples of errors include errors in an operating system running on device 200, triggers contained in an application displaying a web page (e.g., a web browser) that dictate an error condition has arisen, bugs in an application displaying a web page (e.g., a web browser) that cause undesired behavior, bugs in web pages and/or web applications that produce behavior not intended by the author or developer, server errors that cause malfunctions in the web page or web application, and so forth.

Detection of errors by web page error monitoring module 204 includes both automatic error detection and user-specified error detection. Module 204 is illustrated as a separate module in device 200, although it is to be appreciated that module 204 can be implemented as part of another module. For example, module 204 can be implemented as part of a web browser or other suitably configured program, and the functionality of module 204 discussed herein will be performed by the web browser or other suitably configured program.

Automatic error detection is performed by module 204 monitoring web page 202 for various triggers, and detecting that an error has occurred when the condition(s) defined by one of these triggers has been satisfied. Any of a variety of different triggers can be defined using any of a variety of different conditions. For example, network issues can be triggers, performance issues can be triggers, permission errors can be triggers, script errors can be triggers, and so forth. Network issue triggers include, for example, the inability to access a desired location or device on the network, inability to access a desired network, and so forth. Performance issue triggers include, for example, delays in displaying of web pages, delays between user-selection of an option (e.g., a button) and the action corresponding to that option occurring, delays in installing code, and so forth. Permission error triggers include, for example, being denied access to a particular web page, being denied access to a local object or other resource, and so forth. Script error triggers include, for example, attempting to access an unavailable object, attempting to access a nonexistent object, and so forth.

Various other triggers related to the web page or web application can also lead to module 204 detecting that an error has occurred. For example, parsing errors encountered by the application displaying the web page (e.g., a web browser) can be triggers indicating an error. By way of another example, layout and rendering errors encountered by the application displaying the web page (e.g., a web browser) can be triggers indicating an error. By way of yet another example, source errors in a web application can be triggers indicating an error. By way of still another example, web page specific or web application specific errors can be triggers indicating an error.

Such page or application specific errors can be defined in the page or application by the author of the page or application, allowing the author to customize the trigger and error detection as he or she desires.

Automatic error detection can also be performed by module 204 using information that is available in web page 202 and/or a web application embedded in web page 202. For example, the particular triggers can be specified in information embedded in tags in the web application or web page, in header information of the web application or web page, in metadata associated with the web application or web page, and so forth.

Additionally, in one or more embodiments the triggers used by web page error monitoring module 204 are optionally implemented based on various criteria. These criteria can include, for example, requests from or options being set by a user of device 200, information in web page 202 or the web application embedded in web page 202, and so forth. For example, module 204 may monitor web page 202 for errors only if the user of device 200 has opted-in to error reporting in general or error reporting for web pages. By way of another example, particular web pages or web applications may include information (e.g., in tags, in a header, in metadata, etc.) requesting that the web page or web application be monitored for errors.

When an error is automatically detected, bucketizing module 210 assigns the error to a particular one of multiple buckets. Different types of errors are assigned to different buckets, so in assigning a detected error to a particular bucket bucketizing module 210 is assigning a particular error type to the detected error. Generally, bucketizing module 210 assigns the error to a bucket based at least in part on the trigger that occurred that caused the error to be detected.

Various bucketing criteria can be used to assign the error to a bucket. In one or more embodiments, the error is assigned to a bucket based at least in part on the trigger that occurred that caused the error to be detected. In this manner, errors that were caused by the same triggers are grouped together in the same bucket.

Table I lists example bucketing criteria that can be used to assign errors to different buckets. It is to be appreciated that Table I is only an example, and that other criteria could alternatively be used in addition to, or in place of, criteria listed in Table I. Additionally, it is to be appreciated that not all of the criteria listed in Table I need be used to assign an error to a bucket.

TABLE I

| Criteria | Description |
| --- | --- |
| Name | The name of the web application or web page in which the error was detected. |
| Version | The version of the web application or web page in which the error was detected. |
| Failure ID | A unique identifier of the trigger that caused the error to be detected. |
| Domain | A portion of the uniform resource locator (URL) of the web page in which the error was detected. The URL is the address of the web page, and this portion is typically the domain name of the URL. |
| DOM tree hash | A hash value taken by applying a hash function to one or more levels of the document object model (DOM) tree representing the web page in which the error was detected. In one or more embodiments, the hash is taken of the top three levels of the DOM tree, providing a value identifying the basic layout of the web page. Alternatively, the hash function can be applied to more or fewer levels, and can be applied to different locations in the DOM tree (e.g., at the location where an operation was being executed that caused the error to be detected). |
| Actions stack hash | A hash value taken by applying a hash function to a list of the actions that were most recently taken in the application that is displaying the web page (e.g., the actions that were most recently taken in the web browser). In one or more embodiments, the hash function is applied to a list of the last 10 actions, although alternatively the hash function may be applied to fewer or more actions. |
| Error message | An error message that was displayed on the device as a result of the error. This error message could be displayed, for example, by an application displaying the web page (e.g., a web browser), an operating system running on the device, etc. |
| Custom parameter | Any criteria identified by the web page as data that should be used. A web page or web application can customize the criteria to use by specifying the specific criteria to be used. This specified criteria can be criteria described above in Table I, as well as other criteria in addition to or in place of the criteria described above in Table I. |

In addition to, or alternatively in place of, the automatically detected errors, user-specified errors can be detected. In the case of user-specified errors, the errors are identified by the user rather than being automatically detected. An option for the user to initiate reporting of an error is typically presented to the user. This option can be, for example, an icon, a button, a menu item from a drop-down menu, and so forth. When the user believes he or she has encountered an error, the user can select this option to indicate that an error has been encountered. For example, if a user believes that the display of the web page does not look correct, or that a particular operation is taking too long, he or she can indicate that an error has been encountered.

When the user indicates an error has been encountered, user form UI module 212 displays a form for the user to fill out regarding the error. This form can provide any of a variety of different data input options, such as a drop-down menu from which the user can select an error type (e.g., web page does not display correctly, response is taking too long, etc.), a set of radio buttons from which the user can select an error type, a text field into which the user can type a description of the error, and so forth. In one or more embodiments, the user is also able to select a portion of the display in which he or she believes the error occurred. For example, if the user believes particular characters are not being displayed correctly, he or she can select a "locate error position" option. The user can then use a cursor control device (such as a mouse) to navigate a pointer over those characters and make a selection (such as by pressing a mouse button). In response to the selection, module 212 (or alternatively module 204) detects the portion of the web page that was selected, such as by analyzing the DOM tree for the web page to determine the portion.

In response to the user describing the error in the form displayed by user form UI module 212, bucket log module 214 assigns the user-specified error to a particular one of the multiple buckets. Each user-specified error has an associated ID that is used to assign the error to a bucket. This ID can be automatically generated, such as by using the same bucketing criteria discussed above with respect to bucketizing module 210. Alternatively, this ID can be assigned in other manners. For example, each of the different error type options that are presented to the user as part of the form by module 212 (e.g., via a drop-down menu, via radio buttons, etc.) can be associated with a different value, and this value can be the associated ID that is used to assign the error to a bucket.

When an error is detected by module 204, whether it is an automatically detected error or a user-specified error, device state record creation module 208 generates an error record describing a current state of device 200. This error record can include any of a variety of information describing the current state of device 200, including applications (web applications or other applications) running on device 200, hardware that is included in device 200, settings of software or hardware of device 200, current status of device 200 on the network (e.g., network 108 of FIG. 1), and so forth. The data included in this record is intended to give the developer of web page 202, or alternatively another party responsible for correcting errors in web page 202, information regarding the state of device 200 at the time the error occurred in order to assist in correcting any errors that may be in web page 202.

The error record generated by device state record creation module 208 represents a current state of the device at the time the error was detected. However, it is to be appreciated that certain delays may occur, and that certain state of the device may change between the time the error is detected and the error record is generated. For example, after the error is detected, several (or many) additional instructions may be executed before the error record is generated, and these additional instructions alter the state of the device. Module 208 attempts to generate the record quickly so that little state has changed between the time the error is detected and the time the error record is generated.

Table II lists example data that can be included in the error record generated by module 208. The data listed in Table II is data representing the current state of device 200 at the time the data is captured. This capture occurs very shortly (e.g., as soon as module 208 can be invoked) after the error is detected by module 204. It is to be appreciated that Table II is only an example, and that other data could alternatively be included in the error record in addition to, or in place of, data listed in Table II. Additionally, it is to be appreciated that not all of the data listed in Table II need be included in the error record. References to the web page in Table II refer to the web page having the detected error.

TABLE II

| Data | Description |
| --- | --- |
| Netmon light traces | Network traces. Data describing the device's actions on the network, such as were post or get commands in process, was a Secure Sockets Layer (SSL) connection in place, what the most recently received and/or transmitted network packets were, and so forth. |
| Original Source | The HyperText Markup Language (HTML) or other source code (if in a different language) of the web page. |
| URL | The uniform resource locator (URL) which is the address of the web page. |
| OM Dump and DOM Stack | The current object model (OM) for the web page, such as the DOM for the web page. |
| Script and Stacks | Any scripts, as well as the state of the memory that those scripts are accessing, that are included in the web page. |
| Browser Settings | Any preferences or options that have been set by the user of the web browser or other application which displays the web page or runs the web application. |
| Extensions Installed | Any extensions that are installed on the web browser or other application which displays the web page or runs the web application. |
| User Actions Trace | A history of the user's actions, such as the most recent user actions. In one or more embodiments, this is the last 10 actions, although alternatively fewer or more actions may be included. |
| Browser Calls | Any calls to other controls or objects (e.g., any component object model (COM) objects, any ActiveX ® controls, etc.) that are on device 200. |

In one or more embodiments, web page error monitoring module 204 invokes device state record creation module 208 to create an error record that includes the current state of device 200 only if data collection for the bucket to which the error is assigned is turned on. Collection of current state data may be turned on only for certain buckets. Accordingly, module 204 obtains an indication of the bucket to which the error is assigned from bucketizing module 210, and invokes module 208 to create the record of the current state of device 200 only if data collection for that bucket is turned on. If data collection for that bucket is turned off, then module 208 need not create the record of the current state of device 200. Alternatively, module 208 may create the record, or at least begin creating the record, regardless of whether data collection for the bucket is turned on, but then not have the record sent to error reporting server 104 unless data collection for the bucket is turned on.

Data collection for a particular bucket can be turned on and off for various reasons. For example, situations can arise where error reporting server 104 of FIG. 1 has already obtained a large amount of data regarding a particular type of error. In such cases, error reporting server 104 can notify device 200 that data collection for the bucket corresponding to that particular type of error is turned off so that server 104 does not become inundated with error records for the same type of error from devices.

Error reporting module 206 sends a notification that the error occurred to error reporting server 104 of FIG. 1. This notification is sent for both automatically detected errors and user-specified errors. Module 206 can send this notification as soon as the error occurs and all the data has been collected, or alternatively module 206 can collect the information regarding the errors and batch the sending of information regarding multiple errors together (e.g., once per day, once per week, as soon as a certain number of errors have been detected, etc.).

Error reporting module 206 sends the error record created by module 208 to error reporting server 104 (optionally only if the bucket to which the error is assigned is turned on). Error reporting module 206 also sends an indication of a type of the error being reported, which is typically a bucket identifier of the bucket to which the error is assigned whether by bucketizing module 210 or bucket log module 214. This bucket identifier and the error record correspond to or are associated with the same error, and thus the bucket identifier and the error record correspond to or are associated with each other.

Along with the type of the error being reported, additional information such as the criteria used to assign the error to a bucket can also be sent (if not already included as part of the record generated by module 208). Sending the indication of the type of error, even if no record is sent, allows error reporting server 104 to maintain a count of how frequently the error occurs even if records of the current states of the devices are not generated for every error.

In one or more alternate embodiments, the errors may not be assigned to buckets by device 200. Rather, when an error is detected, the record of the current state of device 200 can be generated and sent to error reporting server 104 of FIG. 1. Server 104, in turn, can optionally assign the error to a bucket in the same manner as device 200 discussed above, or alternatively may simply assign the error to a particular basket as discussed below.

In one or more embodiments, web page error monitoring module 204 monitors web page 202 for errors, assigns detected errors to buckets, and creates device state records as discussed herein. However, prior to sending the created record and assigned bucket to server 104, the user is informed that this data will be sent and is permitted to choose whether the data is set. The user can also be given the option to view the specific data that will be sent, as well as view a privacy policy that informs the user how the data will be used.

In addition, some of the operation of device 200 could be transferred to the web page source(s), such as the devices hosting the web pages. For example, when module 204 detects an error, the error record of the current state of device 200 could be sent to the device hosting the web page in which the error was detected or hosting the web page that includes the web application in which the error was detected. This hosting device could then assign the error to a bucket, or alternatively make the error record immediately available to a designer or other administrator of the web page so that what correction, if any, should be made can be determined quickly.

It should also be noted that, although the web page error monitoring module 204 is discussed as detecting the errors, the web page and/or web application itself can alternatively detect the errors. For example, the web page and/or web application could have code or instructions that operate analogous to module 204 as discussed above to detect errors. Module 204 could then be invoked by the web page or web application, such as through an application programming interface (API) exposed by module 204, to act on the detected error as discussed above. In such situations, the detection performed by module 204 would be detection of the error via a call made by the web page and/or web application to the exposed API.

Figure 3:
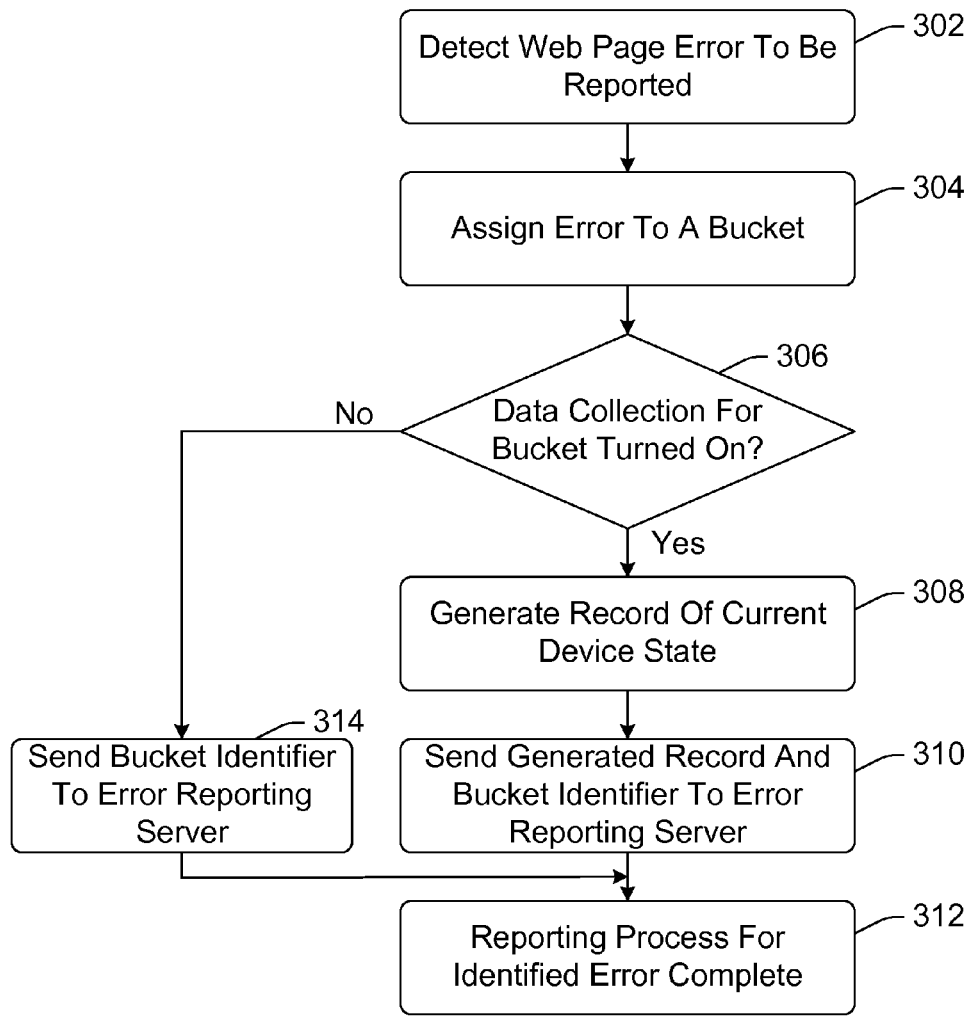
FIG. 3 is a flowchart illustrating an example process for a device reporting errors.

FIG. 3 is a flowchart illustrating an example process 300 for a device reporting errors. Process 300 is carried out by a device, such as device 200 of FIG. 2, and can be implemented in software, firmware, hardware, or combinations thereof. Process 300 is an example process for reporting; additional discussions of reporting errors are included above.

Initially, a web page error to be reported is detected (act 302). As discussed above, this can be an automatic detection or alternatively a user-specified detection. The detected error is assigned to a particular bucket (act 304) that identifies the type of the error.

A check is then made as to whether data collection for the bucket to which the error is assigned is turned on (act 306). If data collection is turned on, then an error record of the current state of the device is generated (act 308). The generated record as well as a bucket identifier that indicates the bucket to which the error is assigned is sent to the error reporting server (act 310). Additional information, such as the criteria used to assign the error to a bucket, is optionally included in this data sent to the error reporting server. The reporting process for the detected error is then complete (act 312).

Returning to act 306, if data collection for the bucket to which the error is assigned is turned off, then a bucket identifier that indicates the bucket to which the error is assigned is sent to the error reporting server (act 314). Additional information, such as the criteria used to assign the error to a bucket, is optionally included in this data sent to the error reporting server. The reporting process for the detected error is then complete (act 312). Alternatively, if data collection for the bucket to which the error is assigned is turned off, then the record of the current state of the device may still be generated but simply not sent to the error reporting server, or the record may still be sent to the error reporting server but deleted or ignored by the error reporting server.

Figure 4:
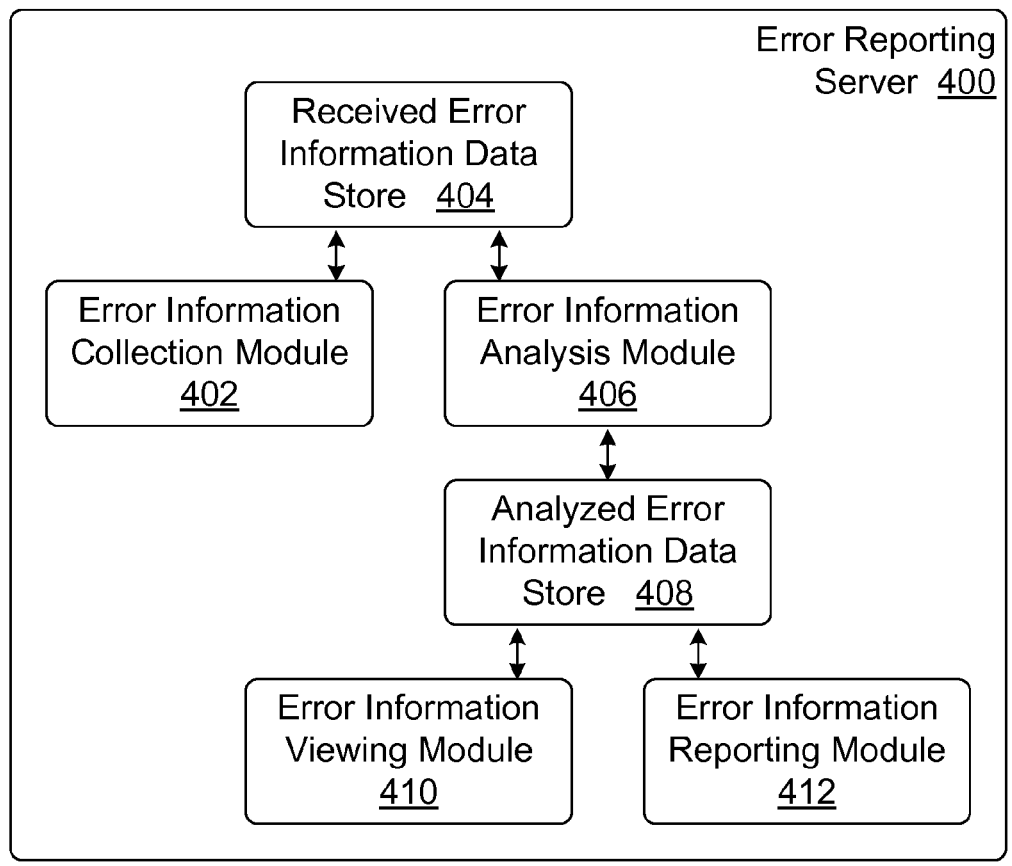
FIG. 4 illustrates an example error reporting server that can be used with the web page error reporting discussed herein.

FIG. 4 illustrates an example error reporting server 400 that can be used with the web page error reporting discussed herein. Error reporting server 400 can be, for example, a server 104 of FIG. 1.

Error reporting server 400 includes an error information collection module 402, a received error information data store 404, an error information analysis module 406, an analyzed error information data store 408, an error information viewing module 410, and an error information reporting module 412. Each of modules 402, 406, 410, and 412 can be implemented in software, firmware, hardware, or combinations thereof. Additionally, modules 402, 406, 410, and 412, as well as stores 404 and 408, can be implemented on the same device, or alternatively can be implemented on two or more different devices.

As discussed above, error reporting server 400 receives information regarding errors detected by devices, including an identifier of the type of error as well as possibly a record of the current state of the device. This information received from the devices is received by error information collection module 402, which stores the data in received error information data store 404. This data stored in store 404 includes a count of how many times errors of particular types are detected by the various devices. In situations where only the identifier of the type of error (e.g., an indication of the bucket to which the detected error was assigned) is received, then the count of how many times that error has been detected is incremented in data store 404 by error information collection module 402.

The information stored by error information collection module 402 in data store 404 is obtained from multiple devices 106 of FIG. 1. These multiple devices use the same criteria for assigning errors to buckets, so multiple devices can detect errors and assign the detected errors to the same bucket. Thus, error information collection module 402 can, and typically does, receive information regarding detected errors that are assigned to the same bucket from multiple devices.

Error information analysis module 406 accesses the information stored in data store 404 received from multiple devices, and analyzes the data to assign the errors to one of multiple baskets. Errors are assigned to baskets based at least on the type of the error. These baskets are similar to the buckets discussed above, however the baskets can, and typically do, include data from multiple devices rather than a single device. Additionally, error information analysis module 406 attempts to group errors into more general baskets in order to find common problems across multiple web pages.

Error information analysis module 406 can assign errors to baskets using any of a variety of different basketing criteria. This basketing criteria can be the same as the bucketing criteria discussed above (e.g., using the example criteria from Table I above), can be based on data received in the error record (e.g., the data from Table II above), or alternatively can be different criteria. Module 406 assigns similar types of errors to the same basket. In one or more embodiments, module 406 uses only selected ones of the criteria as were used by bucketing module 210 of FIG. 2 to assign the errors to buckets. This selected criteria are chosen so that similar types of errors are assigned to the same basket.

For example, assume that the criteria used by bucketing module 210 of FIG. 2 is the criteria discussed above with respect to Table I. The selected criteria used by module 406 can be the name, version, and DOM tree hash. In such situations, errors that occurred at approximately the same portion of the web page would be grouped into the same basket even though the errors occurred for different domains. By way of another example, the selected criteria used by module 406 may be the name, version, and failure ID. In such situations, user-specified errors in the same web application where the user specified the same error type would be grouped into the same basket even though the errors occurred for different domains, different DOM tree hash values, and different action stack hash values.

The creation of baskets can be viewed as merging or combining multiple buckets into a single basket. All of the errors, and corresponding information, that were previously assigned to those multiple buckets are now assigned to the new basket.

In one or more embodiments, the received error information is monitored by error information collection module 402 and/or error information analysis module 406 to determine when data collection for a particular bucket should be turned off. When greater than a threshold number of current device state records are received for a particular bucket, then data collection for that bucket is turned off by module 402 and/or module 406 sending a notification to the devices 106 of FIG. 1 that data collection for that bucket is turned off. This threshold number can be, for example, ten, although larger or smaller numbers can alternatively be used. However, error information collection module 402 continues to receive the information identifying which bucket a detected error was assigned to so that the count of the number of errors of that type (the number of errors that were assigned to that bucket) can be incremented appropriately in data store 404.

Additionally, it should be noted that, once server 400 turns off data collection for a particular bucket, the data collection can subsequently be turned back on. This can be accomplished, for example, by module 402 and/or module 406 sending a notification to the devices 106 of FIG. 1 that data collection for that bucket is turned on. Data collection may be turned back on for a bucket for different reasons, such as the situation where data collection was turned off because the threshold number of current device state records had been received but a developer of a web page having errors may desire more information.

Error information analysis module 406 stores the baskets of records in analyzed error information data store 408. Data store 408 may be a different store, or alternatively the same store, as received error information data store 404. For each basket, data store 408 stores the error information for each error assigned to the basket. This error information includes, for example, records of current device state information for the errors assigned to the basket, and a count of the number of times an error was assigned to a bucket that was included in this basket.

The error information stored in analyzed error information data store 408 can also be accessed by error information viewing module 410 and error information reporting module 412. Modules 410 and 412 operate to display or otherwise present the data from store 408 to web application developers, web page administrators, or any other party. The data can be displayed at different locations, such as at server 400, at a remote device that accesses modules 410 and/or 412 (e.g., via network 108 of FIG. 1), and so forth, or module 412 may generate reports that are transmitted to other devices or for which hard copies are produced.

Error information viewing module 410 displays or otherwise presents the records of current device states to a party requesting them. Individual records can be accessed and the contents of those records can be displayed to the requesting party. Error information reporting module 412 generates and displays (or otherwise presents) records summarizing the information stored in data store 408. Any of a variety of different reports can be generated, such as how many errors were recorded for a particular basket, how many errors were reported for a particular web page and/or version of the web page, what errors were reported during a particular time period (such as last week, in the last 24 hours, in the month of October 2006, and so forth).

Additionally, in one or more embodiments a module such as error information collection module 402 also returns online error response information to devices 106 of FIG. 1. Online error response information is information that can be displayed to a user of a device 106 to inform the user of actions he or she can take to avoid encountering a particular error again in the future. For example, the user may need to change settings on his or her device, install a new version of a program, install a software patch on his or her device, and so forth.

A developer of the web application (or alternatively other individuals) can determine what actions the users should take for particular types of errors, and this information can be returned to the devices 106 by module 402. The information can be returned whenever a detected error for which online error response information is available is received by module 402. Alternatively, module 402 can send the information to web page error monitoring module 204 of FIG. 2 of the device 106 so that the device 106 itself can determine the appropriate online error response information to display when an error is detected without notifying server 400 of the detected error. For example, the online error response information for a particular type of error may be that the user should install a particular software patch on his or her device. When module 402 receives an error from a device 106 with a bucket identifier corresponding to that particular type of error, this online error response information can be returned to device 106 for display to the user.

Figure 5:
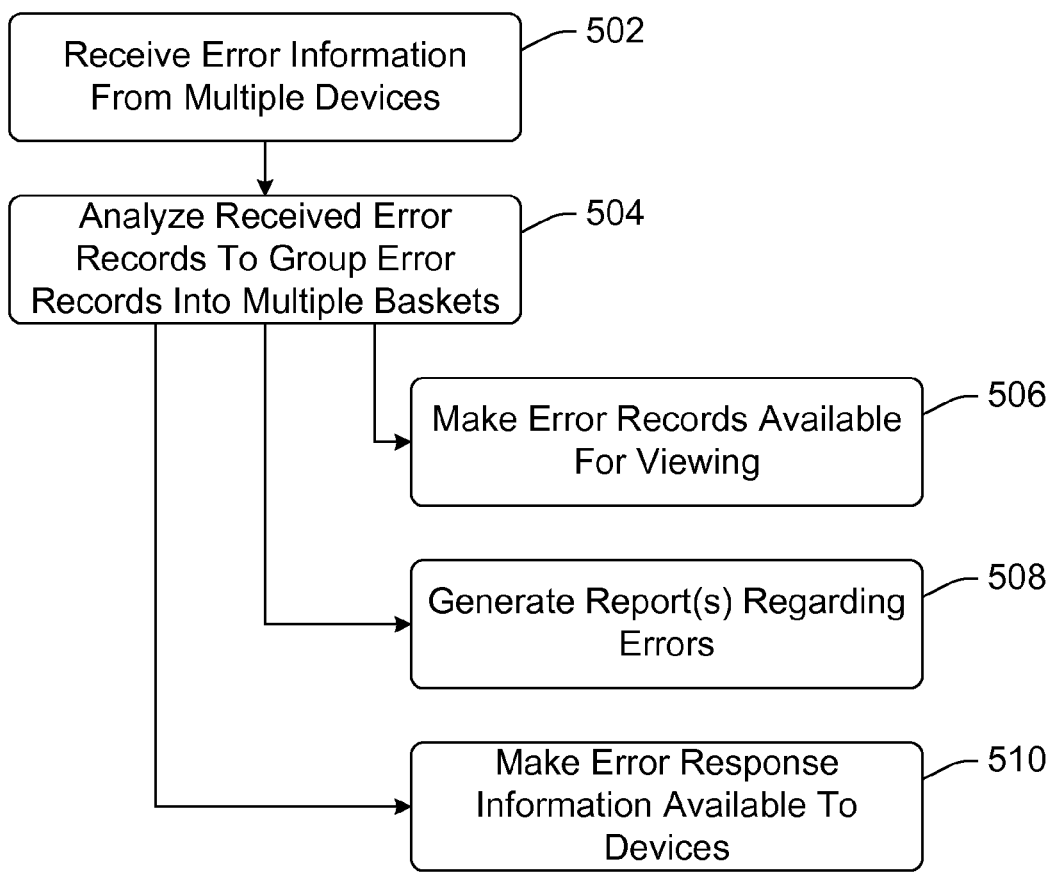
FIG. 5 is a flowchart illustrating an example process for an error reporting server processing error records.

FIG. 5 is a flowchart illustrating an example process 500 for an error reporting server processing error records. Process 500 is carried out by an error reporting server, such as server 400 of FIG. 4, and can be implemented in software, firmware, hardware, or combinations thereof. Process 500 is an example process for processing error records; additional discussions of reporting errors are included above.

Initially, error information is received from multiple devices (act 502). As discussed above, this error information includes bucket identifiers, optionally records of current device state, and optionally the data used by the devices to assign the errors to particular buckets. The received error records are analyzed and grouped into multiple baskets (act 504). These baskets can then be made available for viewing (act 506), reports can be generated regarding the errors that were detected (act 508), and/or online error response information can be made available to the devices (act 510).

Numerous usage scenarios can be created using the web page error reporting discussed herein. Fees could be charged in exchange for the error reporting being performed and/or various collected information being made available. For example, a fee could be charged to various web page developers or providers for performing the error reporting discussed herein. By way of another example, a fee could be charged for certain reports generated by error reporting server 400. By way of yet another example, a fee could be charged for the ability to send online error response information to devices. By way of still another example, a fee could be charged for allowing access to the individual records stored in analyzed error information data store 408 of FIG. 4.

Figure 6:
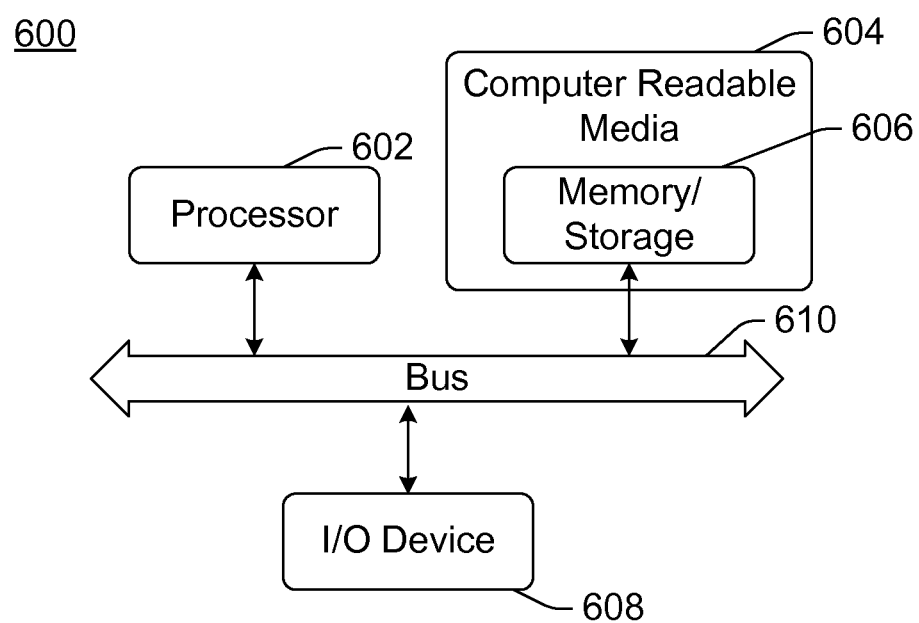
FIG. 6 illustrates an example computing device that can be configured to implement the web page error reporting discussed herein.

FIG. 6 illustrates an example computing device 600 that can be configured to implement the web page error reporting discussed herein. Computing device 600 can be, for example, a web page source 102, error reporting server 104, or device 106 of FIG. 1, a device 200 of FIG. 2, or a server 400 of FIG. 4. Computing device 600 can be any of a variety of different computing devices, such as a desktop computer, handheld computer, laptop computer, server computer, automotive computer, cell phone, personal digital assistant (PDA), game console, and so forth.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or I/O device(s) 608 can be included as part of, or alternatively may be coupled to, computing device 600. Bus 610 represents one or more of any of several types of bus structures, including a memory bus or memory controller, a peripheral bus, an accelerated graphics port, and a processor or local bus using any of a variety of bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer storage media having stored thereon instructions that implement a web browser and that, responsive to execution by one or more processors of a device, cause the web browser to:
    detect, by the web browser, an error in a web page displayed on the device;
    assign the error to a bucket to indicate a type of the error;
    generate a record describing a current state of the device, the current state of the device including both current settings for the web browser and at least a portion of a uniform resource locator (URL) of the web page; and
    send at least one of the record and an indication of the bucket to an error reporting server.

2. One or more computer storage media as recited in claim 1, wherein the current state of the device further includes an indication of which web browser extensions, if any, are installed on the web browser.

3. One or more computer storage media as recited in claim 2, wherein the current state of the device further includes a history of the user's actions in the web browser.

4. One or more computer storage media as recited in claim 1, wherein the error in the web page comprises one or more of: a network issue, a performance issue, a permission error, a script error, a parsing error, a layout and rendering error, a web page or web application error defined in the web page, and a web application source error.

5. One or more computer storage media as recited in claim 1, wherein to assign the error to the bucket is to assign the error based at least in part on one or more of:
    a name of the web page;
    a displayed error message;
    a version of the web page;
    an identifier of a trigger that caused the error to be detected;
    a custom parameter included in the web page;
    a domain of the web page; and
    a hash value taken by applying a hash function to a list of actions that were most recently taken in a web browser displaying the web page.

6. One or more computer storage media as recited in claim 1, wherein the current state of the device further includes an indication of which scripts, if any, are included in the web page.

7. One or more computer storage media as recited in claim 1, wherein the current state of the device further includes source code of the web page.

8. A method, implemented in a web browser running on a device, the method comprising:
    detecting an error in a web page displayed on the device;
    assigning the error to a bucket to indicate a type of the error;
    generating a record describing a current state of the device, the current state of the device including both current settings for the web browser and at least a portion of a uniform resource locator (URL) of the web page; and sending at least one of the record and an indication of the bucket to an error reporting server.

9. A method as recited in claim 8, wherein the current state of the device further includes an indication of which web browser extensions, if any, are installed on the web browser.

10. A method as recited in claim 9, wherein the current state of the device further includes a history of the user's actions in the web browser.

11. A method as recited in claim 8, wherein the current state of the device further includes an indication of which scripts, if any, are included in the web page.

12. A method as recited in claim 8, wherein the current state of the device further includes source code of the web page.

13. A method as recited in claim 8, wherein the error in the web page comprises one or more of: a network issue, a performance issue, a permission error, a script error, a parsing error, a layout and rendering error, a web page or web application error defined in the web page, and a web application source error.

14. A method as recited in claim 8, wherein assigning the error to the bucket comprises assigning the error based at least in part on one or more of:
- a name of the web page;
- a displayed error message;
- a version of the web page;
- an identifier of a trigger that caused the error to be detected;
- a custom parameter included in the web page;
- a domain of the web page; and
- a hash value taken by applying a hash function to a list of actions that were most recently taken in a web browser displaying the web page.

15. A device comprising:
one or more processors; and
one or more computer storage media having stored thereon instructions that implement a web browser and that, responsive to execution by the one or more processors, cause the web browser to:
detect, by the web browser, an error in a web page displayed on the device;
assign the error to a bucket to indicate a type of the error;
generate a record describing a current state of the device, the current state of the device including both current settings for the web browser and at least a portion of a uniform resource locator (URL) of the web page; and
send at least one of the record and an indication of the bucket to an error reporting server.

16. A device as recited in claim 15, wherein the current state of the device further includes an indication of which web browser extensions, if any, are installed on the web browser.

17. A device as recited in claim 15, wherein the current state of the device further includes a history of the user's actions in the web browser.

18. A device as recited in claim 15, wherein the current state of the device further includes an indication of which scripts, if any, are included in the web page.

19. A device as recited in claim 15, wherein the current state of the device further includes source code of the web page.

20. A device as recited in claim 15, wherein the error in the web page comprises one or more of: a network issue, a performance issue, a permission error, a script error, a parsing error, a layout and rendering error, a web page or web application error defined in the web page, and a web application source error.

\* \* \* \* \*